June 19, 1934.　　　　F. E. GIBBIN ET AL　　　　1,963,360
BRUSH
Filed June 18, 1932

INVENTOR
Floyd E. Gibbin
BY　Leslie A. Gibbin
Bean + Brooks
ATTORNEYS

Patented June 19, 1934

1,963,360

UNITED STATES PATENT OFFICE 1,963,360

BRUSH

Floyd E. Gibbin and Leslie A. Gibbin, Springville, N. Y.

Application June 18, 1932, Serial No. 618,060

1 Claim. (Cl. 15—167)

This invention relates to improvements in brushes, particularly that type of brush suitable for use in cleaning full and partial artificial dentures, removable dental bridge work, and also for use in beauty parlors and personal use in the home.

The invention comprehends the provision of a brush preferably formed of resilient flexible composition material having a body member provided with a plurality of tines on one face and with an opposite smooth face, while a handle extends from end of the body member and is enlarged at its free end to provide for the ready manual manipulation of the brush in use, while the enlarged head at the end of the handle, and the handle itself, are provided with a special surface structure in order that they may be used as individual work performing elements in addition to their usual use in the manipulation of the brush.

The improved brush made according to this invention, preferably of molded rubber-like material, has the body member and handle supported by a rod or wire member inserted to extend through the handle and a portion of the body member, so as to reduce the flexibility of the rubber-like material and to enable more efficient manipulation in manual use.

Figure 1:
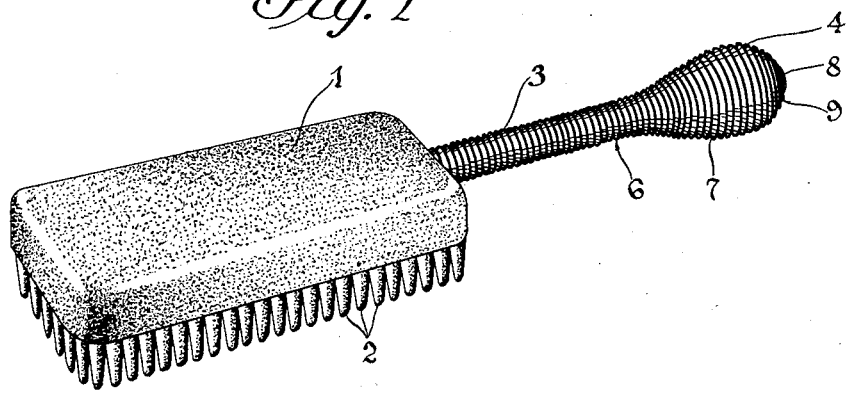
Fig. 1 shows the improved brush construction in perspective.

The improved brush has a body member 1 of substantially rectangular form, preferably formed of molded rubber or other suitable composition material having similar properties in order to provide a brush structure that is resilient and flexible. One side of body member 1 is provided with a plurality of tines 2 projecting from the surface thereof in which the projecting tines form a series of cleaning elements. The opposite side of the body member 1 is formed to provide a smooth or plane surface as clearly shown in the drawing, the purpose of which is hereinafter described.

A handle 3 extends from one end of body member 1 and at the free end is formed to provide an enlarged head 4. This handle 3 and head 4 are both formed of the same material as the body 1, being molded simultaneously therewith.

Figure 2:
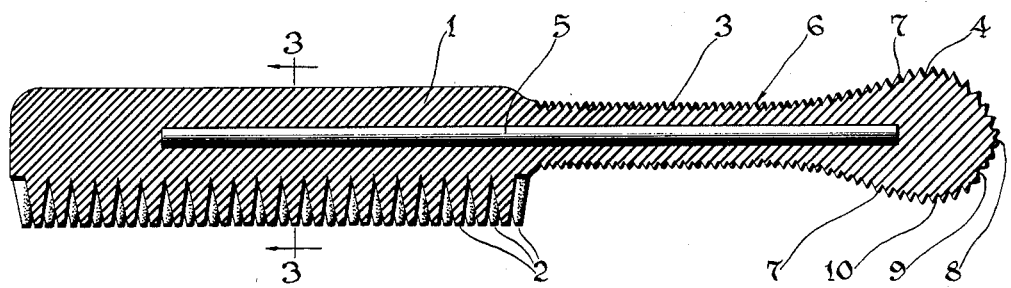
Fig. 2 is a longitudinal cross section through the brush on a substantially enlarged scale.
Figure 3:
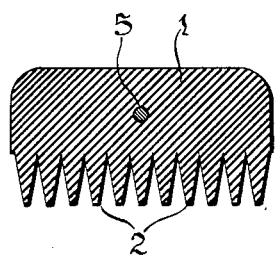
Fig. 3 is a transverse section taken on line 3—3 of Fig. 2.

In order to prevent undue flexing of the rubber composition material, a rod or wire 5 is embedded in the molded material so as to extend axially through handle 3 with the ends terminating in head 4 and body member 1 as clearly shown in Fig. 2 of the drawing.

The entire surface of the handle 3 and head 4 as clearly illustrated in Figs. 1 and 2 of the drawing is provided with a plurality of transversely extending grooves forming a series of projections or ribs as indicated at 6 to provide a corrugated working surface throughout the handle and on the head.

It will be noted that the head is elongated in form having a curved surface at 7 that is substantially convex in form, the radius of the curve for the surface being of substantial length. The portion of the head 4 forming the end of the handle indicated at 8, provides a convex rounded surface, the curvature of which has a radius that is rather short while this portion 8 merges into a portion 9 having its curvature in convex form with the radius of the curve substantially larger than the portion indicated at 8. The portion 9 and the curved portion 7 are joined by a curved portion 10 in which the curve is more abrupt or has a radius that would be less than the radius for either of the portions 7 or 9. This provides a head 4 on the handle of special shape as disclosed in the drawing in order that it will have the desired character of curved surfaces to adapt it for use in cleaning the variously curved portions of dental bridge work and dentures.

In cleaning bridge work the head 4 on the handle is used as a work performing element or member because the corrugated surface thereof is used to clean the inner surface of clasps and groove portions in a removable dental bridge or denture, while the body portion with its tines 2 is used to clean the teeth carried by the bridge work and outer portions thereof, that it is conveniently suited to be used on. In connection with removable bridges, attention is called to the fact that clasps are usually used to hold these bridges in place through the clasps engaging around other natural teeth. The corrugated portion on the handle 3 together with the portion 7 forms a work surface that is used for cleaning the inside of these clasp portions on removable bridges, thus minimizing danger of decay of natural teeth used as anchorage. The portions 8, 9 and 10 are used in connection with cleaning the grooves or other curved surfaces of the bridge work and may also be used in cleaning these clasps or the surfaces of the false teeth carried by the bridge.

This brush structure is also useful in beauty parlors, barber shops and the like, because it is found that the head 4 provides a work member that may be used on the face of an individual and will fit the various contours of the human face while the corrugated surface will operate to remove blackheads and other impurities from the skin. This structure of brush is also useful for massage purposes, the head 4 forming a massaging element as well as the body member 1 either through the use of the tines 2, or the plane back face of the brush may be used in a patting operation in massaging the face or other portions of the body, or in application of creams, lotions and other cleansing agents.

When the smooth face of the body member 1 is used for massaging purposes by patting, the head 4 provides an efficient holding member at the end of the handle that permits its easy manipulation during the patting operation because the brush can be rocked between the fingers of the operator to obtain impacts from the brush, instead of having to produce the impact by holding the brush rigidly in the hand and operating it by forearm motion.

It will thus be seen that the head structure 4, the handle 3 and the body member 1 cooperate to provide a plurality of work elements in a brush structure that have a plurality of cooperative functions in the use of either part as a work member, that facilitates to better advantage the use of either one of the parts as a work member, and as a result provides a new and novel brush structure that has a variety of applications in use.

The invention claimed is:

A cleaning implement comprising a brush back adapted to carry brushing elements, a rod-like extension projecting integrally from one extremity of the brush back, said rod-like extension having a cleaning portion in the form of an enlarged corrugated end portion.

FLOYD E. GIBBIN.
LESLIE A. GIBBIN.